United States Patent
Hogaki et al.

[19]

[11] Patent Number: 6,012,666
[45] Date of Patent: Jan. 11, 2000

[54] BRAKING APPARATUS FOR A BAITCASTING REEL

[75] Inventors: Toshihiko Hogaki; Yukihisa Sato, both of Fuchu, Japan

[73] Assignee: Ryobi Limited, Tokyo, Japan

[21] Appl. No.: 08/986,068

[22] Filed: Dec. 5, 1997

[30] Foreign Application Priority Data

Dec. 27, 1996 [JP] Japan ................... P08-351320

[51] Int. Cl.⁷ ...................................... A01K 89/00
[52] U.S. Cl. .................. 242/321; 242/322; 242/312; 242/314; 242/313; 242/315; 242/288; 242/290; 242/261
[58] Field of Search ...................... 242/321, 322, 242/312, 314, 313, 315, 288, 290, 261

[56] References Cited

U.S. PATENT DOCUMENTS

| | | | |
|---|---|---|---|
| 281,918 | 7/1883 | Palmer | 242/321 |
| 842,551 | 1/1907 | Hunter | 242/322 |
| 1,547,297 | 7/1925 | Case | 242/322 |
| 3,186,656 | 6/1965 | Venable | 242/321 |
| 3,317,159 | 5/1967 | Morritt | 242/321 |
| 5,120,002 | 6/1992 | Kawai | 242/314 |
| 5,556,048 | 9/1996 | Hashimoto | 242/288 |
| 5,746,381 | 5/1998 | Miyazaki | 242/262 |
| 5,810,273 | 9/1998 | Carpenter | 242/261 |

*Primary Examiner*—Donald P. Walsh
*Attorney, Agent, or Firm*—Brooks & Kushman P.C.

[57] ABSTRACT

A baitcasting reel comprises a spool which is rotatably supported between a pair of frame plates of a reel frame body or a pair of side plates respectively secured to the frame plates and is connected to a handle through a driving force transmission means, and a clutch mechanism provided in the driving force transmission means, for selectively keeping the spool in any one of a retrieving condition and a casting condition. Both ends of the spool are supported on the frame plates or the side plates through bearings, respectively. The driving force transmission means is connected with the end of the spool through the clutch mechanism.

16 Claims, 4 Drawing Sheets

F I G. 2 (A)
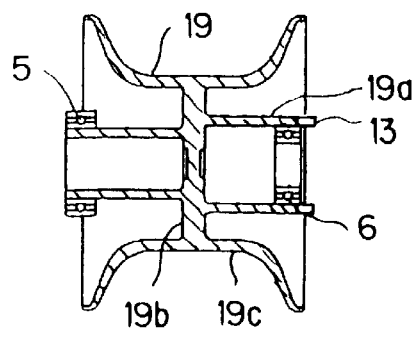
F I G. 2 (B)
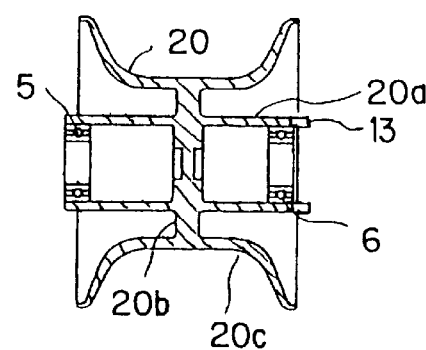
F I G. 2 (C)
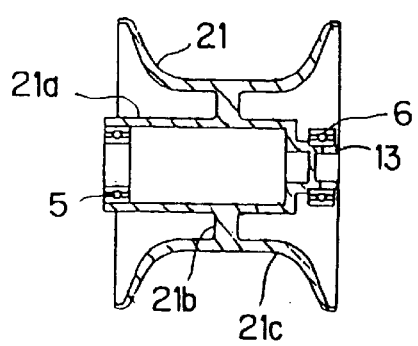
F I G. 2 (D)
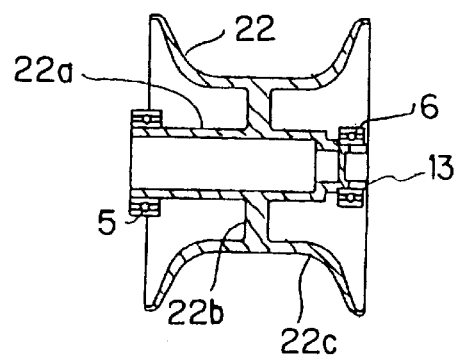

BRAKING APPARATUS FOR A BAITCASTING REEL

BACKGROUND OF THE INVENTION

1. Field of the Invention

The present invention relates to a baitcasting reel having a spool which permits to decrease rotational resistance during free rotation thereof.

2. Description of the Related Art

In a baitcasting reel, a spool shaft to which a spool is secured, is rotatably supported between right and left-hand frame plates of a reel frame body or between a pair of side plates respectively secured to the frame plates, and the spool is rotated by a rotational operation of a handle supported on one of the frame plates or the side plate secured thereto, to wind a fishing line onto the spool. There is provided a clutch mechanism in a driving force transmission means connecting the spool shaft and the handle, thus making it possible to selectively keep the spool in any one of a retrieving condition (i.e., a condition in which the fishing line can be wound onto the spool and cannot be paid out) and a casting condition (i.e., a condition in which the fishing line can be paid out) by the "ON/OFF" operation of the clutch mechanism.

However, in the conventional baitcasting reel, a pinion of the clutch mechanism is slidably and rotatably put on the spool shaft which is separately formed from the spool and stationarily secured to the spool, with the result that the pinion interferes with the spool shaft to exert an adverse influence on the free rotation of the spool, even when the clutch mechanism is kept in an "off" condition, thus acting as resistance to the rotation of the spool for paying out the fishing line therefrom.

The technical concepts for decreasing rotational resistance during free rotation of the spool of the baitcasting reel have therefore been proposed in Japanese Utility Model Publication No. S60-10380, Japanese Utility Model Provisional Publication No. S57-158372, Japanese Utility Model Registration No. 3006602, Japanese Patent Provisional Publication No. H8-242730 and Japanese Patent Provisional Publication No. H3-216138.

In all of the baitcasting reels disclosed in Japanese Utility Model Publication No. S60-10380, Japanese Utility Model Provisional Publication No. S57-158372, Japanese Utility Model Registration No. 3006602 and Japanese Patent Provisional Publication No. H8-242730, interference of the pinion with the spool shaft during free rotation of the spool is prevented by forming the pinion supporting shaft separately from the spool shaft integrally rotated with the spool, and supporting both ends of the respective spool shaft and pinion supporting shaft on the frame plates or side plates. However, the spool and the spool shaft are rotated integrally with each other, with the result that most of the component masses of the combination of the spool with the spool shaft concentrate in a position in the vicinity of the rotation axis of the spool, thus decreasing the moment of inertia accordingly and causing a problem that it is hard to maintain the free rotation of the spool by inertia caused by the rotation thereof for a long period of time.

In such a conventional baitcasting reel, the weight of the spool is increased by the weight of the spool shaft, and accordingly, a relatively larger force is required for braking the rotation of the spool, making it uneasy not only to carry out a proper braking operation against the rotation of the spool, but also to make fine adjustments in braking.

On the other hand, in the baitcasting reel disclosed in Japanese Patent Provisional Publication No. H3-216138, interference of the pinion with the spool shaft during free rotation of the spool is prevented by rotatably supporting the spool on the spool shaft through bearings, which is supported on the both side plates. However, a higher strength of the spool shaft is required due to the fact that the spool is supported on the spool shaft supported on the both side plates, resulting in increase in diameter of the spool shaft. In addition, the ensuring of a sufficient strength for withstanding force applied for winding the fishing line onto the spool may increase the diameter of the fishing line winding body of the spool accordingly, thus causing a problem of decrease in winding capacity of the fishing line onto the spool, since the bearings exist between the spool shaft and the spool.

In all of the conventional baitcasting reels mentioned above, the spool is supported by means of the spool shaft passing through the spool, thus causing a problem that it is impossible to decrease the weight of the baitcasting reel.

SUMMARY OF THE INVENTION

An object of the present invention is therefore to provide a baitcasting reel which permits to maintain the free rotation of the spool by inertia caused by the rotation thereof for a long period of time, makes it easy not only to carry out an easy and proper braking operation against the rotation of the spool, but also to make fine adjustments in braking, ensures the large winding capacity of the fishing line onto the spool, and causes the spool to be lightweight.

In order to attain the aforementioned object, a baitcasting reel comprises a spool which is rotatably supported between a pair of frame plates of a reel frame body or a pair of side plates respectively secured to the frame plates and is connected to a handle through a driving force transmission means, and a clutch mechanism provided in the driving force transmission means, for selectively keeping the spool in any one of a retrieving condition and a casting condition, wherein:

both ends of said spool are supported on the frame plates or the side plates through bearings, respectively; and said driving force transmission means is connected with the end of the spool through the clutch mechanism.

The above-mentioned spool may be formed into a hollow cylindrical shape.

A movable shaft may be supported on one of the frame plates so as to be movable on an extended line of an axial line of the spool by a position adjusting means; and the spool may be held between one end of the movable shaft and another of the frame plates or the side plate secured thereto, which face the end of the movable shaft.

The held portions of the spool which are brought into contact with the end of the movable shaft and the other of the frame plates or the other of the side plates, respectively, may be formed of a wear resistant hard material.

A spool-inserting opening having a diameter substantially identical to an outer diameter of a flange portion of the spool may be formed in one of the frame plates; and one ends of the spool may be supported on (i) the side plate which is detachably secured to the one of the frame plates or (ii) a cover plate detachably secured to the side plate so as to close an opening formed on the side plate, which opening faces the spool-inserting opening.

A braking means for imparting a braking force to the spool may be provided between one of the both ends of the spool and the frame plate or the side plate which faces the one of the both ends of the spool.

BRIEF DESCRIPTION OF THE DRAWINGS

FIGS. 2(A), 2(B), 2(C) and 2(D) are cross sectional views illustrating modifications of a spool, which can be used in the baitcasting reel of the present invention;

DETAILED DESCRIPTION OF THE PREFERRED EMBODIMENTS

Now, embodiments of a baitcasting reel of the present invention will be described in detail below with reference to the accompanying drawings.

Description will be given of the baitcasting reel of the first embodiment of the present invention with reference to FIG. 1.

Figure 1:
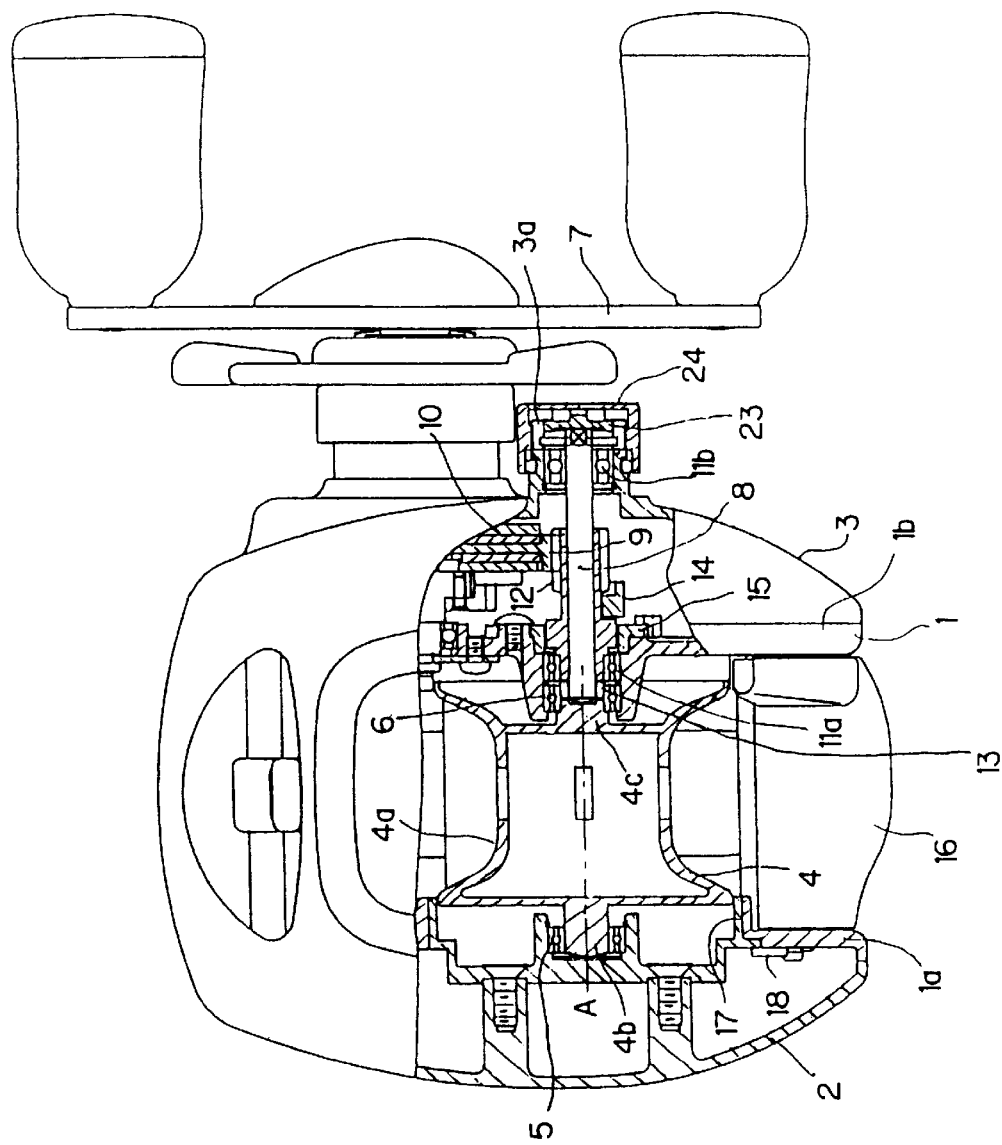
FIG. 1 is a plan view having a partially sectioned portion, illustrating a baitcasting reel of the first embodiment of the present invention.

In the baitcasting reel of the first embodiment of the present invention, a pair of side plates 2, 3 are secured, as shown in FIG. 1, to right and left-hand frame plates 1a, 1b of a reel frame body 1, respectively. A spool 4 onto which a fishing line is to be wound is rotatably supported between the right-hand frame plate 1b and the left-hand side plate 2 through bearings 5, 6.

The spool 4 is connected to a handle 7 through a driving force transmission means as described below. A handle shaft (not shown) and a pinion shaft 8 are supported parallelly and rotatably between the right-hand frame plate 1b and the right-hand side plate 3. The handle 7 is stationarily secured to the above-mentioned handle shaft, the intermediate portion of which has a master gear 9 put thereon through a drag mechanism 10 and the other components, so that the turning of the handle 7 causes the rotation of the master gear 9 relative to the handle 7 through frictional resistance of the drag mechanism 10.

The pinion shaft 8 is arranged on an extended line of the rotational axial line A of the spool 4, and the left-hand end of the pinion shaft 8 is supported on the right-hand frame plate 1b through the bearing 11a, and the right-hand end thereof is supported on the right-hand plate 3 through the bearing 11b. A pinion 12 is put on the above-mentioned pinion shaft 8 so as to be rotatable and slidable thereon, and the pinion 12 is engaged with the above-mentioned master gear 9.

A meshing portion 13 is provided between the left-hand end of the pinion 12 and the right-hand end of the spool 4. The meshing portion 13 which comprises any one of male and female portions formed on the left-hand end of the pinion 12 and the other of the male and female portions formed on the right-hand end of the spool 4, is constructed so that the engagement of the pinion 12 with the spool 4 and the disengagement thereof from the spool 4 can selectively be made by sliding the pinion 12 on the pinion shaft 8 together with a clutch plate 14 by means of a clutch mechanism described later.

The engagement of the pinion 12 with the spool 4 by means of the meshing portion 13 to keep the clutch mechanism in an "ON" condition causes inhibition of free rotation of the spool 4 to maintain a condition in which the fishing line cannot be paid out from the spool 4. In such a condition, when the handle 7 is turned in the winding direction of the fishing line, the force given by the turning of the handle 7 is transmitted to the handle shaft (not shown), the master gear 9 and the pinion 12 in this order, to cause the spool 4 to be rotated, thus making it possible to wind the fishing line onto the spool 4.

The disengagement of the pinion 12 from the spool 4 by means of the meshing portion 13 to keep the clutch mechanism in an "OFF" condition causes the spool 4 to be freely rotated to maintain the other condition in which the fishing line can be paid out from the spool 4. In such a condition, a casting operation can be carried out to pay out the fishing line from the spool 4 by the weight of rigs such as a lure, a sinker or the like.

The above-mentioned pinion 12 may be arranged rotatably and slidably between the right-hand frame plate 1b and the right-hand side plate 3 by means of bearings respectively provided on these plates 1b, 3, without being put on the pinion shaft 8 mentioned above. Although the pinion shaft 8 is described to be supported by the right-hand frame plate 1b and the right-hand side plate 3, the pinion shaft 8 may be supported by means of the other member separately secured to the right-hand frame plate 1b or the right-hand side plate 3.

The clutch mechanism comprises the known switching device described below. The clutch plate 14 is fitted to the pinion 12 so as to be rotatable relative thereto. The engagement of the pinion 12 with the spool 4 or the disengagement thereof from the spool 4 by means of the meshing portion 13 can selectively be made by sliding the dutch plate 14 on the pinion shaft 8 in the axial direction thereof, to maintain selectively a condition in which the force from the handle 7 can be transferred to the spool 4 or the other condition in which the force therefrom cannot be transferred to the spool 4.

The clutch plate 14 is constructed so as to be slidable on the pinion shaft 8 in the axial direction thereof by means of a pin (not shown) provided in the reel frame body 1. A coil spring (not shown) for imparting the constant pressing force to the pinion 12 through the clutch plate 14 is fitted to the above-mentioned pin so that the engagement of the pinion 12 with the spool 4 by means of the meshing portion 13 can be maintained. The clutch plate 14 is brought into contact with a clutch cam 15 for moving the clutch plate 14 against the pressing force of the coil spring in the direction in which the disengagement of the pinion 12 from the spool 4 by means of the meshing portion 13 can be made. The above-mentioned clutch cam is formed as a rotor which is rotatably supported on the right-hand frame plate 1b in the vicinity of the pinion 12. The clutch cam is connected to a clutch lever 16 swingably supported between the left-hand frame plate 1a and the right-hand frame plate 1b so as to be operatable by means of the clutch lever 16.

According to the above-described construction, a cam of the clutch plate 15 does not interfere with the clutch plate 14 and the clutch plate 14 is accordingly kept in a position as shown in FIG. 1, thus making the engagement of the pinion 12 with the spool 4 by means of the meshing portion 13, unless the clutch lever 16 is pushed down for example by a finger. As a result, the turning of the handle 7 in this condition causes the spool 4 to be rotated in the winding direction.

When the clutch lever 16 is pushed down by means of a finger, the clutch cam 15 is turned, and the clutch plate 14 is shifted in the right-hand direction in FIG. 1 against the pressing force of the coil spring by means of the cam of the clutch cam 15, to move the pinion 12 in the same direction. As a result, the disengagement of the pinion 12 from the spool 4 by means of the meshing portion 13 is made, thus maintaining a condition in which the spool 4 can freely be rotated. In such a condition, a casting operation can be carried out to pay out the fishing line from the spool 4 by the weight of rigs such as a lure, a sinker or the like.

As is clear from FIG. 1, the above-mentioned spool 4 is composed only of the spool body 4a having a hollow cylindrical shape (i.e., a drum-shape) and has no shaft passing through the spool body in the axial direction unlike the conventional spool, and may therefore be called "shaftless spool". The right-hand circular end plate, or partition wall, and the left-hand circular end plate of the spool body 4a are rotatably supported on the right-hand frame plate 1b and the left-hand side plate 2 through the bearings 5, 6, respectively. More specifically, the right and left-hand end plates of the spool body 4a are integrally provided with projections 4b, 4c, respectively, which are inserted into the inner rings of the bearings 5, 6, respectively. One of the male and female portions by which the meshing portion 13 is comprised, is formed on the end of the right-hand projection 4c mentioned above.

The above-described spool 4 can be removed from the position between the both frame plates 1a, 1b of the reel frame body 1 in the following manner. More specifically, the right and left-hand projections 4b, 4c are inserted into the inner rings of the bearings 5, 6, respectively, so as to be removable from these inner rings. A spool-inserting opening 17 having a diameter substantially identical to the outer diameter of the flange portion of the spool 4 is formed in the left-hand frame plate 1a, the left-hand side plate 2 is detachably secured to the left-hand frame plate 1a by means of a conventional securing means, and the bearing 5 for supporting the left-hand projection 4b of the spool body 4a is mounted on the left-hand side plate 2 mentioned above. According to such a construction, when the left-hand side plate 2 is removed from the left-hand frame plate 1a, there is exposed the spool-inserting opening 17 through which the spool 4 can be removed. In the first embodiment of the present invention, a locking piece 18 is used as a means for detachably securing the left-hand side plate 2 to the left-hand frame plate 1a.

In the first embodiment of the present invention, the spool 4 is designed to be detachable by removing the left-hand side plate 2 from the left-hand frame plate 1a, the spool 4 may however be designed to be detachable by forming an opening on the left-hand side plate 2, which faces the above-mentioned spool-inserting opening 17, removably fitting a cover plate to the left-hand side plate 2 so as to close the above-mentioned opening, and supporting one end of the spool body 4a on the cover plate. The spool 14 may be designed to be detachable by forming the spool-inserting opening 17 on the right-hand frame plate 1b, and removing the right-hand side plate 3 from the right-hand frame plate 1b. In such a case, the both ends of the spool 4 are supported through bearings on the left-hand frame plate 1a and a driving mechanism-fitting plate which is secured to the right-hand side plate 3 by means of the conventional securing means, and the pinion shaft 8 is also supported on the driving mechanism-fitting plate through bearings, or the pinion 12 is also supported at the left end portion thereof on the driving mechanism-fitting plate through bearings.

The spool body 4a described above may be modified as shown in FIGS. 2(A) to 2(D). All the spool bodies 19,20, 21 and 22 as shown in FIGS. 2(A) to 2(D) are provided with cylindrical portions 19a, 20a, 21a and 22a with bottoms, or partition walls, the center axes thereof are identical with the rotational axes of the spool bodies 19, 20, 21 and 22, and with fishing line winding portions 19c, 20c, 21c and 22c formed around the cylindrical portions 19a, 20a, 21a and 22a so as to be connected thereto through leg portions 19b, 20b, 21b and 22b.

In the spool body 19 as shown in FIG. 2(A), the left-hand bearing 5 of the bearings 5 and 6 arranged at the supporting portions of the spool body 19 on the frame plates 1a, 1b or the side plates 2, 3 is fitted on the outer surface of the cylindrical portion 19a, and the right-hand bearing 6 is fitted on the inner surface of the other cylindrical portion 19a. In the spool body 20 as shown in FIG. 2(B), the right and left-hand bearings 5 and 6 are fitted on the inner surface of the cylindrical portions 20a, respectively. In the spool body 21 as shown in FIG. 2(C), the left-hand bearing 5 is fitted on the on the inner surface of the cylindrical portion 21a, and the right-hand bearing 6 is fitted on the outer surface of the other cylindrical portion 21a. In the spool body 22 as shown in FIG. 2(D), the right and left-hand bearings 5 and 6 are fitted on the outer surface of the cylindrical portions 22a, respectively.

In each of the spool bodies as shown in FIGS. 2(A) and (B), any one of the male and female portions of which the meshing portion 13 is composed, is formed on the right-hand end of the cylindrical portion 19a or 20a into which the outer ring of the bearing 6 is fitted. In each of the spool bodies as shown in FIGS. 2(C) and (D), any one of the male and female portions of which the meshing portion 13 is composed, is formed on the right-hand end of the cylindrical portion 21a or 22a onto which the inner ring of the bearing 6 is fitted.

A braking force can be applied to the spool body 4a by means of a mechanical braking device described below. The mechanical braking device utilizes the pinion shaft 8 to impart a braking force to the spool 4. The pinion shaft 8 is designed as a movable shaft which is supported on the right-hand frame plate 1b so as to be movable on the extended line of the rotational axis "A" of the spool by means of a position adjusting means arranged on the right-hand side plate 3. The spool body 4a is held between one end of the above-mentioned movable shaft (i.e., the pinion shaft 8) and the left-hand side plate 2 which faces the end of the movable shaft. The position adjusting means comprises a leaf spring 23 arranged at the right-hand end of the pinion shaft 8 which passes through the right-hand side plate 3, and an adjusting knob having a box nut-shape, which is engaged with the boss 3a formed on the right-hand side plate 3 so as to cover the leaf spring 23 and the right-hand end of the pinion shaft 8. The clockwise or counterclockwise turning of the adjusting knob 24 causes change in resilient force applied by the leaf spring 23, to increase or decrease force by which the spool 4 is held between the securing members including the pinion shaft 8 and the left-hand side plate 2, thus adjusting a braking force applied to the spool 4. Such a braking force may attenuate a rotational inertia force of the spool 4 during paying out the fishing line from the spool 4, resulting in prevention of occurrence of backlash.

The held portions of the spool body 4a which are brought into contact with the left-hand side plate 2 and the movable shaft having a function of the pinion shaft 8 are preferably formed of a wear resistant hard material. Ceramic or stainless steel material may be used as a wear resistant hard material. When the held portions mentioned above of the spool body 4a is formed of such a wear resistant hard material, or pieces made of the wear resistant hard material are arranged on the held portions thereof, it is possible to improve wear resistance of the spool body 4a, thus extending the service life of the spool body 4a.

With respect to the mechanical braking device, the same position adjusting means as described above may be provided not on the right-hand side plate 3, but on the left-hand side plate 2 located opposite the pinion shaft 8, the pinion shaft 8 may be supported on the right-hand side plate 3 so as not to be movable in the axial direction thereof, and the braking force may be applied to the spool 4 by urging the projection 4b of the spool 4 against the pinion shaft 8.

Now, operation of the baitcasting reel of the first embodiment of the present invention will be described below.

The clutch mechanism is kept on in the "ON" condition in which the male portion and female portions of which the meshing portion 13 is composed are engaged with each other, unless the clutch lever 16 is pushed down. In such a condition, the force given by the turning of the handle 7 is transmitted to the spool body 4a through the master gear 9, the pinion 12 and the clutch mechanism, with the result that the spool body 4a is rotated, and the fishing line is wound onto the spool body 4a.

When the clutch lever 16 is pushed down for example by a finger to keep the male portion of the meshing portion 13 away from the female portion thereof to make the disengagement of the pinion 12 from the spool body 4a. In such a condition, the free rotation of the spool body 4a is permitted, with the result that the fishing line can be paid out from the spool body 4a by the weight of rigs such as a lure, a sinker or the like.

In the above-described first embodiment of the baitcasting reel of the present invention, the spool body 4a is composed of the hollow body and does not have the same spool shaft as in the conventional baitcasting reel, the weight of the spool body 4a can remarkably be decreased, thus making it possible to apply an effective braking force to the spool body 4a. The spool body 4a has no spool shaft and is supported at the both end thereof, the spool can therefore be provided with the fishing line winding portion having a deeper groove. As a result, the winding capacity of the fishing line onto the spool can be increased, even when the spool is formed in a smaller size. In addition, most of the component masses of the spool body 4a exist in a position apart from the rotation axis of the spool body 4a, thus permitting the increase in moment of inertia, and it is therefore possible to maintain the free rotation of the spool body 4a by inertia caused by the rotation thereof for a long period of time.

Description will be given of the baitcasting reel of the second embodiment of the present invention with reference to FIG. 3.

Figure 3:
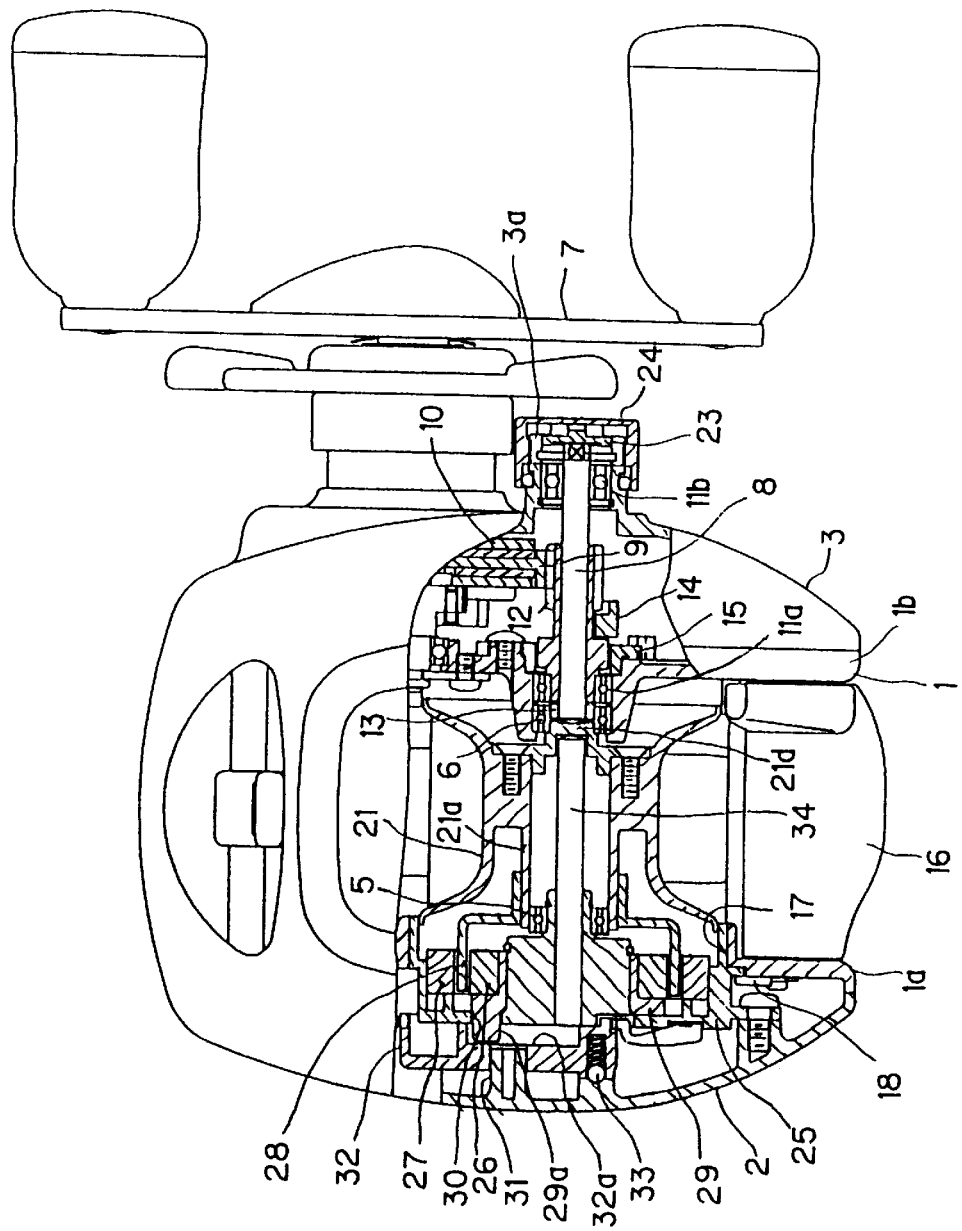
FIG. 3 is a plan view having a partially sectioned portion, illustrating a baitcasting reel of the second embodiment of the present invention.

The baitcasting reel of the second embodiment of the present invention shown in FIG. 3 has (i) the same spool body 21 as shown in FIG. 2(C), which is explained as one of the modifications of the spool body in the description of the first embodiment of the present invention, and (ii) a magnet braking device as a spool braking means, which is provided, in addition to the same mechanical braking device as used in the first embodiment of the present invention, between the left-hand end of the spool body 21 and the left-hand side plate 2 facing thereto.

More specifically, the baitcasting reel the second embodiment of the present invention is identical to the baitcasting reel of the first embodiment thereof except that the former is provided with the above-mentioned magnet braking device. The same reference numerals are applied to the same components, and the description thereof is omitted.

The magnet braking device comprises a series of inner magnets 26 circumferentially arranged on a boss portion 25 secured to the left-hand side plate 2, a series of outer magnets 27 circumferentially arranged around the boss portion 25 so as to surround the series of inner magnets 26 to form an annular space therebetween, and a ring member 28 made of non-magnetic material, which is stationarily secured to the cylindrical portion 21a of the spool body 21 and is inserted in the annular space mentioned above.

The above-mentioned magnet braking device is provided with a phase adjusting mechanism which is the same as the conventional mechanism, for making a phase adjustment between the series of inner magnets 26 and the series of outer magnets 27. In the second embodiment of the present invention, the portion of the boss portion 25 for holding the series of inner magnets 26 is formed as a ring member 29 which is rotatable relative to the boss portion 25, and a projecting portion 29a projected from the ring member 29 toward the inner surface of the left-hand side plate 2 passes through a slotted hole 30 formed on the boss portion 25. A supporting shaft 31 is projected from the inner surface of the left-hand side plate 2, an adjusting lever 32 having a groove 32a is swingably supported on the above-mentioned supporting shaft 31, and the projecting portion 29a mentioned above is inserted into the groove 32a of the adjusting lever 32. A click-stop mechanism is provided between the adjusting lever 32 and the left-hand side plate 2, which comprises recesses circumferentially formed on the inner surface of the left-hand side plate 2, a ball 33 received in a hole formed on the adjusting lever 32 and a spring arranged in the above-mentioned hole, for pushing the ball 33 toward the left-hand side plate 2 so that the ball 33 can be received in any one of the recesses. According to such a construction, the turning of the adjusting lever 32 around the supporting shaft 31 causes the rotation of the ring member 29 together with the series of inner magnets 26 due to the engagement of the projecting portion 29a of the ring member 29 with the groove 32a of the adjusting lever 32, thus making a phase adjustment between the series of the inner magnets 26 and the series of the outer magnets 27 to increase or decrease the braking force applied to the spool 21.

A brake shaft 34 is secured coaxially to the above-mentioned boss portion 25, and the right-hand end of the brake shaft 34 passes through the spool body 21 and comes into contact with the right-hand bottom portion, or partition wall, 21d of the spool body 21. As a result, a braking force given by the above-described mechanical braking device is produced by holding the bottom portion 21d of the spool body 21 between the securing members including the brake shaft 34 and the movable shaft having a function of the pinion shaft 8.

The spool 21 is supported at its both ends on the reel frame body 1 through the bearings, and the above-mentioned brake shaft 34 does not support the spool 21. The brake shaft 34 may be formed in a smaller diameter and of light-weight material such as aluminum.

Figure 4:
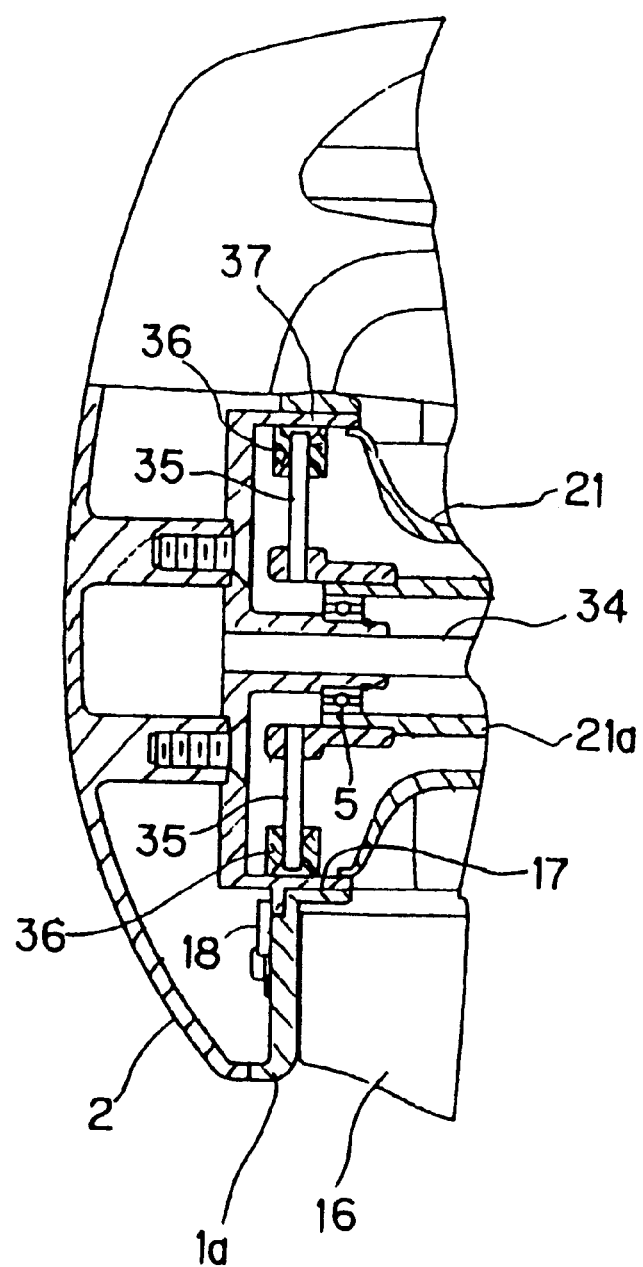
FIG. 4 is a plan view having a partially sectioned portion, illustrating a baitcasting reel of the third embodiment of the present invention.

Description will be given of the baitcasting reel of the third embodiment of the present invention with reference to FIG. 4.

The baitcasting reel of the third embodiment of the present invention is provided with a centrifugal braking device in replacement of the magnet braking device explained in the description of the second embodiment of the present invention. More specifically, the baitcasting reel the third embodiment of the present invention is identical to the baitcasting reel of the second embodiment thereof except that the former is provided with the above-mentioned centrifugal braking device. The same reference numerals are applied to the same components, and the description thereof is omitted.

The centrifugal braking device comprises radial axes 35 secured on the outer surface of the cylindrical portion 21a of the spool body 21, brake shoes 36 slidably fitted on the radial axes 35, respectively, and a brake ring member 37 secured to the left-hand side plate 2, for surrounding the radial axes 35 so that the brake shoes 36 can be brought into contact with the inner peripheral surface of the brake ring member 37. When the rotational velocity of the spool body 21 is increased, a frictional force between the brake shoes 36 and the brake ring member 37 is also increased, thus imparting a braking force to the spool body 21 to decrease the rotational velocity of the spool body 21.

According to the present invention as described in detail, since the spool is composed only of the spool body without the same spool shaft as used in the conventional baitcasting reel, it is possible to decrease a number of components and a number of assembling steps, and in addition, to decrease the weight of the spool so as to achieve the easy braking of the spool, thus improving the effect of preventing the occurrence of backlash. Most of the component masses of the spool exist in a position apart from the rotation axis of the spool, moment of inertia of the spool can be increased even when the weight thereof is decreased, and it is therefore possible to maintain the free rotation of the spool by inertia caused by the rotation thereof for a long period of time. The fishing line winding portion of the spool can be formed in a smaller size because of no existence of the same spool shaft as in the conventional baitcasting reel, and the spool itself can also be formed in a smaller size, thus permitting the production of the small-sized and light-weight baitcasting reel.

When the spool is formed into a hollow cylindrical shape, it is possible to achieve further decrease in weight of the spool.

When a movable shaft is supported on one of the frame plates so as to be movable on an extended line of the axial line of the spool by a position adjusting means; and the spool is held between one end of the movable shaft and the other of the frame plates or the side plate secured thereto, which face the end of the movable shaft, it is possible to apply an effective braking force to the spool.

When the held portions of the spool which are brought into contact with the end of the movable shaft and the other of the frame plates or the other of the side plates, respectively, are formed of a wear resistant hard material, it is possible to improve the durability of the spool.

When a spool-inserting opening having a diameter substantially identical to an outer diameter of a flange portion of the spool is formed in one of the frame plates; and one end of the spool is supported on (i) the side plate which is detachably secured to one of the frame plates or (ii) a cover plate detachably secured to the side plate so as to close an opening formed on the side plate, which opening faces the spool-inserting opening, it is possible to remove the spool from the reel frame body only by removing the side plate or the cover, thus permitting easy and rapid replacement of the spool and the fishing line.

When a braking means for imparting a braking force to the spool is provided between one of the both ends of the spool and the frame plate or the side plate which faces the one of the both ends of the spool, it is possible to easily set the braking means therebetween.

What is claimed is:

1. A baitcasting reel comprising a spool which is rotatably supported between a pair of frame plates of a reel frame body or a pair of side plates secured to the frame plates and is connected to a handle through a driving force transmission means, and a clutch mechanism provided in the driving force transmission means, for selectively keeping the spool in any one of a retrieving condition and a casting condition, wherein:

said spool has a hollow cylindrical portion formed around a central axis of said spool, said spool being supported at both its ends located in opposite ends of said hollow cylindrical portion on the frame plates or the side plates, said spool having at least one partition wall formed in said hollow cylindrical portion, said spool being held at said at least one partition wall between securing members provided on said side plates so as to impart a braking force to said spool.

2. A baitcasting reel as claimed in claim 1, wherein:

one of said securing members between which said at least one partition wall is held is a movable shaft supported so as to be movable on an extended line of an axial line of the spool; and said braking force imparted to said spool can be changed by adjusting a holding force provided by an amount of movement of said movable shaft.

3. A baitcasting reel as claimed in claim 2, wherein:

held portions of said spool which are brought into contact with the end of said movable shaft and the other of said frame plates or the other of the side plates, respectively, are formed of a wear resistant hard material.

4. A baitcasting reel as claimed in claim 1, wherein:

a spool-inserting opening having a diameter substantially identical to an outer diameter of a flange portion of said spool is formed in one of said frame plates; and one end of said spool is supported on (i) the side plate which is detachably secured to said one of said frame plates or (ii) a cover plate detachably secured to the side plate so as to close an opening formed on the side plate, which opening faces said spool-inserting opening.

5. A baitcasting reel as claimed in claim 2, wherein:

a spool-inserting opening having a diameter substantially identical to an outer diameter of a flange portion of said spool is formed in one of said frame plates; and one end of said spool is supported on (i) the side plate which is detachably secured to said one of said frame plates or (ii) a cover plate detachably secured to the side plate so as to close an opening formed on the side plate, which opening faces said spool-inserting opening.

6. A baitcasting reel as claimed in claim 3, wherein:

a spool-inserting opening having a diameter substantially identical to an outer diameter of a flange portion of said spool is formed in one of said frame plates; and one end of said spool is supported on (i) the side plate which is detachably secured to said one of said frame plates or (ii) a cover plate detachably secured to the side plate so as to close an opening formed on the side plate, which opening faces said spool-inserting opening.

7. A baitcasting reel as claimed in claim 2, wherein:

a spool-inserting opening having a diameter substantially identical to an outer diameter of a flange portion of said spool is formed in one of said frame plates; and one end of said spool is supported on (i) the side plate which is detachably secured to said one of said frame plates or (ii) a cover plate detachably secured to the side plate so as to close an opening formed on the side plate, which opening faces said spool-inserting opening.

8. A baitcasting reel as claimed in claim 1, wherein:

a braking means for imparting a braking force to said spool is provided between one of said both ends of said spool and the frame plate or the side plate which faces said one of said both ends of said spool.

9. A baitcasting reel as claimed in claim 2, wherein:
a braking means for imparting a braking force to said spool is provided between one of said both ends of said spool and the frame plate or the side plate which faces said one of said both ends of said spool.

10. A baitcasting reel as claimed in claim 3, wherein:
a braking means for imparting a braking force to said spool is provided between one of said both ends of said spool and the frame plate or the side plate which faces said one of said both ends of said spool.

11. A baitcasting reel as claimed in claim 1, wherein:
a braking means for imparting a braking force to said spool is provided between one of said both ends of said spool and the frame plate or the side plate which faces said one of said both ends of said spool.

12. A baitcasting reel as claimed in claim 4, wherein:
a braking means for imparting a braking force to said spool is provided between one of said both ends of said spool and the frame plate or the side plate which faces said one of said both ends of said spool.

13. A baitcasting reel as claimed in claim 5, wherein:
a braking means for imparting a braking force to said spool is provided between one of said both ends of said spool and the frame plate or the side plate which faces said one of said both ends of said spool.

14. A baitcasting reel as claimed in claim 6, wherein:
a braking means for imparting a braking force to said spool is provided between one of said both ends of said spool and the frame plate or the side plate which faces said one of said both ends of said spool.

15. A baitcasting reel as claimed in claim 7, wherein:
a braking means for imparting a braking force to said spool is provided between one of said both ends of said spool and the frame plate or the side plate which faces said one of said both ends of said spool.

16. The baitcasting reel as claimed in claim 1, wherein:
said spool has a fishing line winding portion; and
a portion of said spool between said hollow cylindrical portion and said fishing line winding portion is removed so that said hollow cylindrical portion expands to the vicinity of said fishing line winding portion.

* * * * *

UNITED STATES PATENT AND TRADEMARK OFFICE
CERTIFICATE OF CORRECTION

PATENT NO : 6,012,666
DATED : January 11, 2000
INVENTOR(S) : Toshihiko Hogaki

It is certified that error appears in the above-identified patent and that said Letters Patent is hereby corrected as shown below:

Column 10, line 56, replace "claim 2" with --claim 1--.

Signed and Sealed this

Twenty-fourth Day of October, 2000

Attest:

Q. TODD DICKINSON

*Attesting Officer*     *Director of Patents and Trademarks*